April 22, 1958     H. K. McCULLEY     2,831,280
FASTENING DEVICE
Filed June 13, 1953                           2 Sheets-Sheet 1
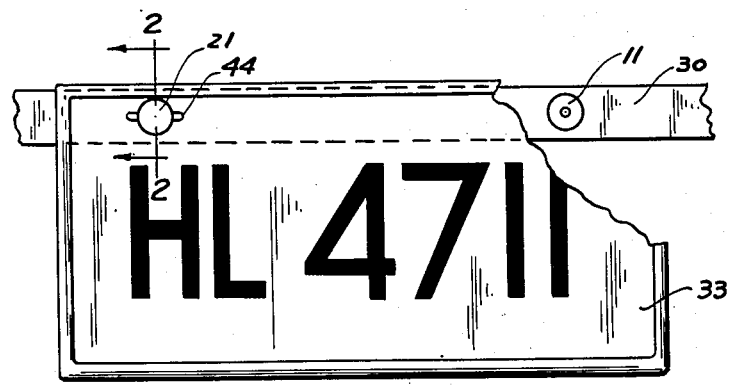
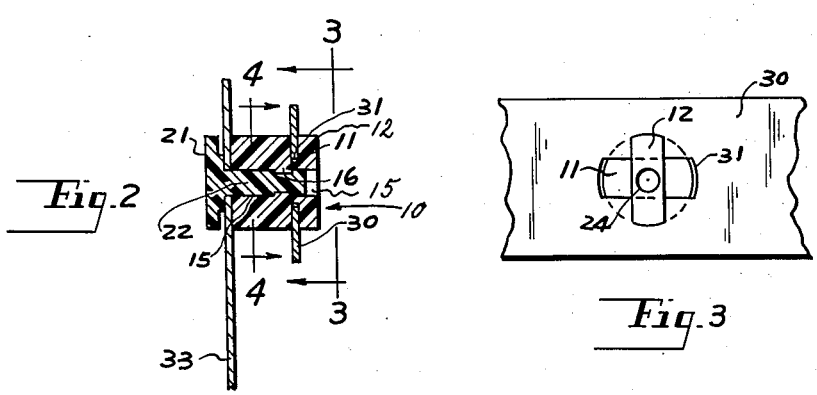
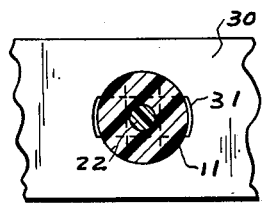
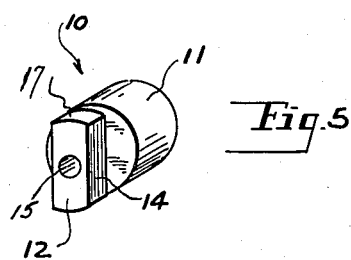
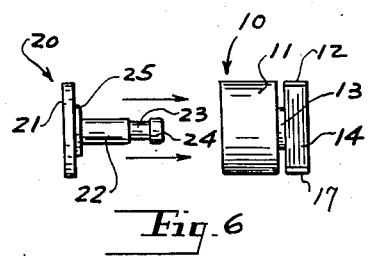
INVENTOR.
HENRY K. McCULLEY
BY Louis Mayka
ATTORNEY April 22, 1958     H. K. McCULLEY     2,831,280
FASTENING DEVICE
Filed June 13, 1953     2 Sheets-Sheet 2
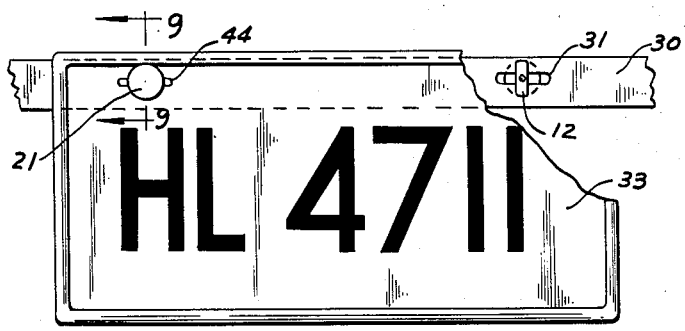
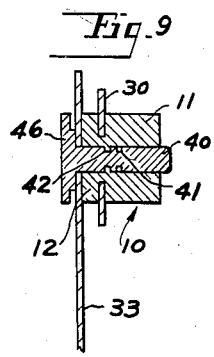
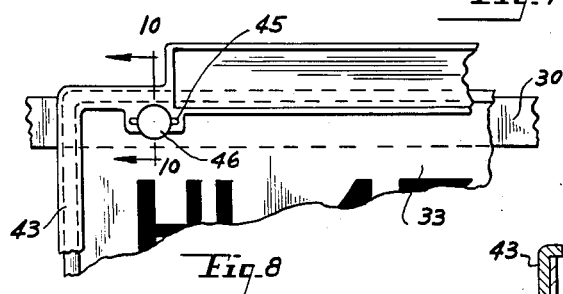
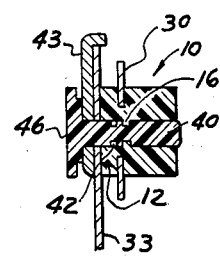
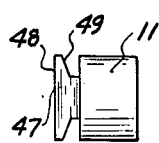
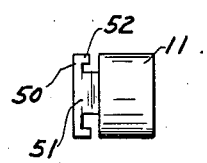
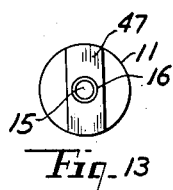
INVENTOR.
HENRY K. McCULLEY
BY Louis Clayska
ATTORNEY.

United States Patent Office 2,831,280
Patented Apr. 22, 1958

2,831,280

FASTENING DEVICE

Henry K. McCulley, North Branch, Mich.

Application June 13, 1956, Serial No. 591,056

3 Claims. (Cl. 40—125)

The improvement pertains to a device adapted to connect two or more elements to each other, which device is particularly adapted for the purpose of fastening a license plate to a bracket carried by an automotive vehicle. The device is of a type which may be employed for use without the need of any tools.

A further object of my invention is to provide a fastener of a simple structural design but fully practical for the purposes for which it has been designed.

I shall now describe my improvement with reference to the accompanying drawings in which:

Fig. 1 is a front view of a license plate for automobiles, the plate being broken off to disclose a bracket on which the plate is mounted;

Fig. 2 is a sectional view on line 2—2 of Fig. 1;

Fig. 3 is a rear view of one member of the device as seen from line 3—3 of Fig. 2;

Fig. 4 is a sectional view on line 4—4 of Fig. 2;

Fig. 5 is a perspective view of one component member of the device;

Fig. 6 is an exploded view, in side elevation, of two component parts of the device;

Fig. 7 is a front elevational view of a license plate, the view being similar to that shown in Fig. 1 but disclosing a different manner of application of my fastener;

Fig. 8 is a fragmentary front elevational view of a license plate mounted upon a bracket and displayed within a frame which, with the plate, is secured to the bracket by means of my fastener;

Fig. 9 is a sectional view on line 9—9 of Fig. 7;

Fig. 10 is a sectional view on line 10—10 of Fig. 8;

Fig. 11 is a modified side elevational view of one element of my fastener;

Fig. 12 is a side elevational view of another modified species of the same element of the fastener;

Fig. 13 is a front end view of the element shown in Fig. 11.

Similar numerals refer to similar parts throughout the several views.

The device is made of two component parts. One of them, generally marked 10, is made of resilient material, such as rubber or a suitable plastic, and includes a portion having the form of a cylinder 11. Integrally connected to said portion 11, by means of a neck 13, is a bar 12 disposed diametrically with respect to said cylinder 11, the bar being defined by two parallel sides 14 and by arcuate end surfaces 17. Because of the inclusion of said neck in said member 10, the bar is in a spaced relation to said cylinder 11.

For the purpose of being connected to its complementary member, generally marked 20, said member 10 is provided with an axial bore 15 which contains an annular shoulder 16, the bore being open at both ends. The complementary element comprises a bolt 22 terminating at one end with a flat head 21, the bolt being provided with an annular groove 23 and ending with a gland 24. The head 21 includes, on the side joined to said bolt, a disk-like spacer 25.

Assuming that the fastener is to be used to secure a license plate upon a bracket on the body of an automobile, the following is the manner in which the fastener is to be employed for the purpose:

A customary bracket, including a bar-like member 30, is provided with a pair of oblong horizontal slots 31, as shown in Fig. 3. A license plate, such as plate 33 shown in Fig. 1, is also provided with a pair of slots, as shown at 44, for application of such means as screws to secure the plate to the bracket. Instead of using such screws, I first secure one component member of my fastener, namely, the cylindrical member 10, to the bracket by inserting bar 12 of said member 10 into a slot 31 till the bracket bar bears against the cylindrical body 11 of the member 10. In this position of the member 10, the edges of the slot 31 in the bracket bar will fit into the spacing between the bar 12 and the cylinder 11. At this stage, said member 10 is turned 90 degrees about its axis in either direction, as shown in Figs. 3 and 4, till the bar 12 will be in a vertical position crosswise to the slot, as shown in Fig. 3, when the horizontal edges of the slot 31 will be gripped by said bar and by said cylindrical portion 11 of member 10.

Thereupon, the shank 22 of member 20 is inserted through slot 44 in the license plate 33 and thrust into the bore 15 till the gland 24 of the shank will have passed the annular constricted portion of the bore where said constricted portion forms a shoulder 16.

With the bolt in the bore, there will be a spacing left between the outer rim of the head 21 of the bolt and the face of the license plate 33, as shown in Fig. 2. The space will permit an easier manual grasp of the head of the bolt for the purpose of withdrawing the bolt out of said member 10 in case the plate were to be removed from the bracket.

The drawing in Fig. 9 shows how member 10 may be applied to bracket 30 in such a manner that bar 12 will be disposed between the bracket and the license plate 33. The drawing also shows a modified bolt 40 which, instead of being provided with one annular groove 23, as shown in Fig. 6, is provided with two such grooves, the grooves being marked 41 and 42, respectively. This particular arrangement is useful when the license plate is displayed in a frame. The frame 43, which is of conventional design, is provided with a number of slots, such as slot 45 shown in Fig. 8. Two such slots in the frame are adapted to be brought in register with slots 44 in the license plate.

If both the plate and the frame are to be secured to member 10 by means of the bolt 40, then, because of their combined thickness, the bolt must be provided with an extra annular groove, that is, groove 41, to permit engagement of the shoulder 16 within member 10 with said groove. Specifically, groove 42 will come into engagement with said shoulder 16 in a case where only the license plate is to be secured by the bolt to member 10, as shown in Fig. 9, and groove 41 will come into engagement with said shoulder when both the license and the frame therefor will be secured to the member 10 by said bolts. This latter arrangement is shown in Fig. 10.

Fig. 11 shows a modified species of member 10, in which species the diametrical bar 47 has ends 48 each of which is defined, on the side facing the cylindrical portion 11, by a slanting face 49.

In another modified species of said member 10, shown in Fig. 12, each end 50 of the diametrical bar 51 is provided with an inwardly-extending tab 52. In both cases the modified ends of the bar were designed to impart more flexibility to the ends of the bar to allow for small changes in the thickness of different license plates, the frames therefor, or both.

It will be understood that some changes may be made in the structure of my fastener without departing from the inventive concept disclosed herein.

What I, therefore, wish to claim is as follows:

1. In combination with a bracket bar having a plurality of oblong slots for reception of means for suspension of an automobile license plate, a license plate, means for securing said plate to said bracket bar comprising a two-element fastener comprising a keeper of resilient material, the keeper including a cylindrical portion and a bar integrally connected to one end of the cylindrical portion in a diametrical relation thereto, the bar being spaced therefrom for reception of the edges of the slot between said bar and the above said end of the cylindrical portion, the keeper being provided with an axial bore having an annular shoulder therein, and a bolt provided with an annular groove, the bolt being adapted to be thrust into the bore in the keeper for engagement of the annular groove therein with the annular shoulder in said bore.

2. In combination with a bracket having a plurality of slots for reception of means for support of an automobile license plate, a license plate, means for securing said plate to said bracket bar comprising a two-element fastener, one of the elements being of resilient material and forming a keeper comprising a body cylindrical and a narrow bar integrally connected to one end of said body in a diametrical and spaced relation thereto, the bar being adapted to be thrust through one of the slots and to be turned with the keeper to assume a position at right angle to the length of the slot, in order that the edge portions of the slot may be gripped by the bar from one side and from the other side by the end portion of the cylindrical body and a bolt adapted to be thrust into the bore of the keeper from end of said bore, for a frictional engagement therewith.

3. In combination with a bracket having a plurality of slots for reception of means for support of an automobile license plate, a license plate, means for securing said plate to said bracket bar comprising a two element fastener, one of the elements being of resilient material and forming a keeper comprising a body cylindrical and a narrow bar integrally connected to one end of said body in a diametrical and spaced relation thereto, the bar being adapted to be thrust through one of the slots and to be turned with the keeper to assume a position at right angle to the length of the slot, in order that the edge portions of the slot may be gripped by the bar from one side and from the other side by the end portion of the cylindrical body, the cylindrical body being provided with an axial bore provided with annular shoulder means and a bolt adapted to be thrust into the bore from end thereof, the bolt being provided with a plurality of annular grooves for a selective engagement with said shoulder.

References Cited in the file of this patent

UNITED STATES PATENTS

| | | |
|---|---|---|
| 1,387,090 | Wing | Aug. 9, 1921 |
| 1,421,548 | Pendergast et al. | July 4, 1922 |
| 1,768,192 | Depfer | June 24, 1930 |
| 2,180,960 | Kennedy | Nov. 21, 1939 |
| 2,185,553 | Hill | Jan. 2, 1940 |
| 2,538,396 | Sutin | Jan. 16, 1951 |
| 2,592,130 | Erb et al. | Apr. 8, 1952 |

FOREIGN PATENTS

| | | |
|---|---|---|
| 520,777 | Great Britain | May 3, 1940 |
| 745,788 | Great Britain | Feb. 29, 1956 |